(No Model.)
H. J. GINN.
COMBINATION HARROW.
No. 420,682. Patented Feb. 4, 1890.
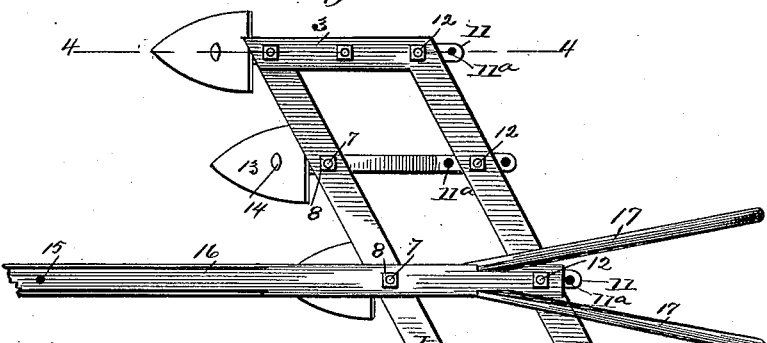
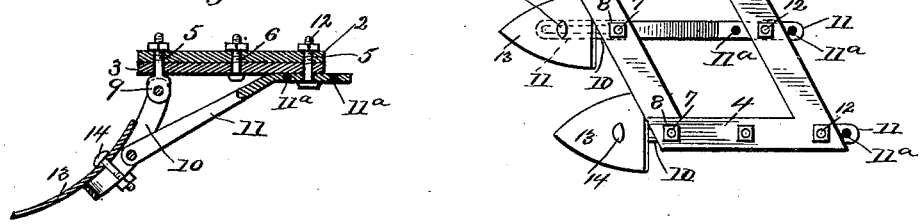
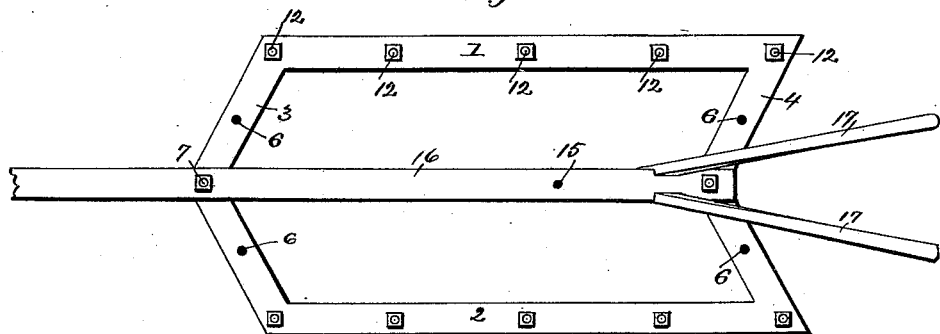
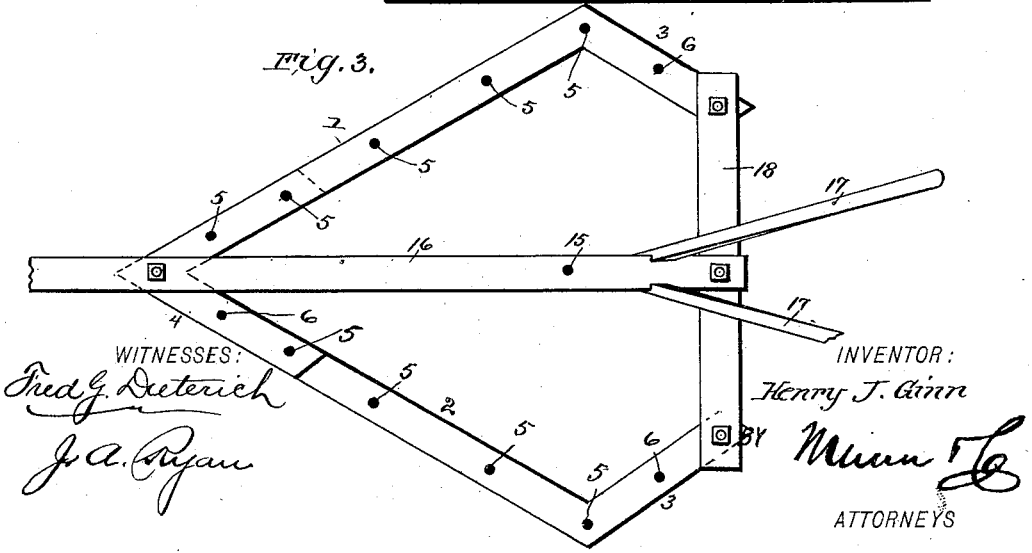
WITNESSES:
Fred G. Dieterich
J. A. Ryan
INVENTOR:
Henry J. Ginn
BY
Munn & Co.
ATTORNEYS

UNITED STATES PATENT OFFICE.

HENRY J. GINN, OF BOWMAN, GEORGIA.

COMBINATION-HARROW.

SPECIFICATION forming part of Letters Patent No. 420,682, dated February 4, 1890.

Application filed September 25, 1889. Serial No. 325,089. (No model.)

*To all whom it may concern:*

Be it known that I, HENRY J. GINN, of Bowman, in the county of Elbert and State of Georgia, have invented a new and useful Improvement in Combination-Harrows, of which the following is a specification.

My invention is an improvement in the class of sectional harrows whose frames are composed of bars arranged at a greater or less angle to each other. I employ a harrow-frame section made integral, and having a particular form, whereby it is adapted for use in making up harrows of different contours, and intended for use under different conditions of the soil or crops.

Referring to the accompanying drawings, Figure 1 is a plan view of my improved harrow arranged as a side harrow. Fig. 2 is a plan view of the same arranged as a double-foot plow-stock. Fig. 3 is a plan view arranged as a V-shaped harrow. Fig. 4 is a vertical transverse section on the line 4 4, Fig. 1.

The same numerals of reference indicate corresponding parts in all the figures.

Referring to the several parts by their designating numerals, 1 and 2 indicate the two sections of my new and improved harrow, consisting each of the main part having the inclined parallel ends 3 4. The body of each section is formed with five apertures 5, and the inclined ends of the sections are formed with the bolt-holes 6.

In Fig. 1 I have shown the harrow arranged as a side harrow, the two sections 1 2 being placed parallel, with their ends overlapping and bolted together, as shown. Through the apertures 5 of the front bar or section 1 are passed bolts 7, having nuts 8 screwed upon their upper threaded ends to hold them in place, while their lower ends are formed with the long flattened apertured heads 9. To these flat apertured heads are pivoted the upper ends of doubled standards 10, each standard or foot having pivoted midway in it the lower end of a brace 11, the upper end of which is secured by a bolt 12, which passes up through the apertures 5 of the rear section 2, and is held by a nut on its upper threaded end. The upper end of each brace 11 is formed with a series of holes 11ª, so that the brace can be moved back and forth and secured by the bolt 12, by which construction any desired inclination can be given to the standards 10 and the plow-blades secured upon them, as the standards can be thus moved backward or forward, as desired.

Any desired kind of plow-blade 13 can be used on the standards 10, being preferably adjustably secured thereto by bolts 14 passing through the standards, and having nuts on their ends, so that the plow-blades can be adjusted up or down on the standards to regulate their depth.

The stems of the middle bolts 12 and 7 pass up through two of a series of apertures 15 in a plow-beam 16, which has the usual handles 17, the bolts having nuts on their upper ends, and by this means the beam is secured to the harrow. It will be seen that my harrow when thus arranged will form a perfect side harrow.

In Fig. 2 I have shown my harrow arranged as a double-foot plow-stock, in which the overlapping ends of the sections 1 2 can be moved to bring the sides of the harrow nearer together or farther apart, the holes 6 in the section ends permitting this adjustment. The plow-beam is bolted on the crossed ends of the sections 1 2, as shown, and the standards are secured to the harrow-sections, as shown and before described, by the bolts 7 9, the braces 11, and bolts 12, one of the standards and braces being secured to the middle of the plow-beam, as shown.

In Fig. 3 is shown my harrow arranged as a V-harrow, the acute-angled ends of the sections 1 2 being overlapped and bolted together, while their other ends are separated and bolted to a straight-apertured brace 18. The plow-beam is bolted on the center of this connecting-brace and the front overlapped ends of the sections 1 2, as shown, and common harrow-teeth are preferably used with this form of the harrow, although my new standards, bolts, and braces may be employed with it when desired.

Having thus described my invention, what I claim, and desire to secure by Letters Patent, is—

1. An apertured frame-section for use in making up harrow-frames of different forms, the same being composed of a straight bar and parallel end portions arranged, respectively, at an obtuse and acute angle, all constructed in one piece, as shown and described.

2. The improved rhomboidal harrow-frame, formed of the two sections 1 and 2, provided with holes for attachment of teeth, each section being constructed of a straight bar having short end portions 3 and 4 formed integrally with them, and arranged parallel, one end portion being at an obtuse angle and the other at an acute angle, and the same being overlapped and bolted together, as shown and described.

HENRY J. GINN.

Witnesses:
JAMES G. GINN,
CHARLES W. HALL.